US008091874B2

(12) United States Patent
Ray Avalani

(10) Patent No.: US 8,091,874 B2

(45) Date of Patent: Jan. 10, 2012

(54) BAR CLAMP WITH MULTI-DIRECTIONAL ADJUSTABLE PADS

(76) Inventor: Bianca R. Ray Avalani, Princeton, NJ (US)

( * ) Notice: Subject to any disclaimer, the term of this patent is extended or adjusted under 35 U.S.C. 154(b) by 1008 days.

(21) Appl. No.: 11/872,694

(22) Filed: Oct. 15, 2007

(65) Prior Publication Data

US 2008/0029944 A1 Feb. 7, 2008

Related U.S. Application Data

(63) Continuation of application No. 10/873,991, filed on Jun. 22, 2004, now abandoned, and a continuation-in-part of application No. 10/842,121, filed on May 10, 2004, now abandoned.

(51) Int. Cl.

| | |
|---|---|
| ***B25B 1/00*** | (2006.01) |
| ***B25B 1/02*** | (2006.01) |
| ***B43L 5/00*** | (2006.01) |
| *F16M 13/00* | (2006.01) |

(52) U.S. Cl. .................. 269/6; 269/3; 269/88; 269/155; 269/166

(58) Field of Classification Search .......... 260/6; 269/3, 269/88, 155, 166–171.5, 203, 204

See application file for complete search history.

(56) References Cited

U.S. PATENT DOCUMENTS

| | | | | |
|---|---|---|---|---|
| 334,055 | A | 1/1886 | Shaw | |
| 624,815 | A | 5/1899 | Jantz et al. | |
| 1,349,963 | A | 8/1920 | Jerrim | |
| 2,174,947 | A | 10/1939 | Ramsey | |
| 2,773,406 | A | 12/1956 | Dachauer | |
| 4,632,375 | A | 12/1986 | Yang | |
| 4,874,155 | A | 10/1989 | Goul | |
| 5,009,134 | A | 4/1991 | Sorensen et al. | |
| 5,022,137 | A | 6/1991 | Sorensen et al. | |
| 5,048,808 | A | 9/1991 | Yang | |
| 5,145,157 | A | 9/1992 | Polk | |
| 5,427,364 | A | 6/1995 | Zborschil | |
| 5,443,246 | A | 8/1995 | Peterson | |
| 5,799,933 | A | 9/1998 | Yang | |
| 5,853,168 | A | 12/1998 | Drake | |
| 6,029,964 | A * | 2/2000 | Bohl | 269/6 |
| 6,179,279 | B1 | 1/2001 | Asai et al. | |
| 6,206,355 | B1 | 3/2001 | Lichtenberg | |
| 6,240,815 | B1 | 6/2001 | Huang | |
| 6,367,787 | B1 | 4/2002 | Poole et al. | |
| 6,382,608 | B1 | 5/2002 | Michell | |

(Continued)

*Primary Examiner* — Alvin Grant

(74) *Attorney, Agent, or Firm* — Arent Fox LLP

(57) ABSTRACT

A bar clamp with adjustable jaw pads for clamping and for spreading work pieces includes a main housing having a bar opening for extending a bar therethrough, and a bar advancing mechanism with a bar gripping member in proximity to the bar opening. There is an elongated slide bar extending through the bar opening, and a handle and trigger connected to the main housing wherein the trigger is connected to the bar advancing mechanism such that activation of the trigger causes advancement of the bar through the main housing. It also includes a first jaw base connected to the main housing and extending upwardly therefrom. A first jaw pad is rotatably connected to the first jaw base, so as to be rotatable in at least two planes, to adjust angles between the elongated slide bar and the first jaw pad. A separate, second jaw base is connected to the elongated slide bar. There is a second jaw pad rotatably connected to the second jaw base, so as to adjust an angle between the elongated slide bar and the second jaw pad. The second jaw pad is rotatable in at least one plane, preferably two and in some embodiments, three planes.

24 Claims, 4 Drawing Sheets

U.S. PATENT DOCUMENTS

| | | | |
|---|---|---|---|
| 6,386,530 | B1 | 5/2002 | Marks |
| 6,412,767 | B1 | 7/2002 | Beckmann et al. |
| 7,216,862 | B2 | 5/2007 | Walsh |
| 2005/0121842 | A1 | 6/2005 | Lo |

* cited by examiner

BAR CLAMP WITH MULTI-DIRECTIONAL ADJUSTABLE PADS

CROSS REFERENCE TO RELATED APPLICATION(S)

The present application for patent is continuation application of application Ser. No. 10/873,991, entitled "BAR CLAMP WITH MULTI-DIRECTIONAL ADJUSTABLE PADS," filed Jun. 22, 2004, now abandoned and is a continuation-in-part application of application Ser. No. 10/842,121, entitled "BAR CLAMP WITH ADJUSTABLE ANGLE JAW PADS," filed May 10, 2004, now abandoned both of which are hereby incorporated by reference herein.

BACKGROUND OF THE INVENTION

1. Field of the Invention

The present invention relates to adjustable bar clamps that provide moveable jaws that may be tightened toward one another for clamping a work piece and may be tightened against a work piece in a spreading fashion. The present invention bar clamps provide for adjustable angle opposing jaw pads in at least two different planes. These jaw pads may be free-floating, and, hence, will be self-adjusting; they may be free-floating with a locking means at each jaw to maintain angles to which the jaws had self-adjusted; or they may be rotatable for selection and locking of one or more angles at each jaw.

2. Information Disclosure Statement

The following prior art is representative of the state of the art in the field of bar clamp systems:

U.S. Pat. No. 5,009,134 describes a bar clamp having a fixed jaw and a movable jaw which is radially movable over both short and long distances to clamp against a workpiece and operable using one hand with complete control by the operator at all times. The jaws may either face one another while being mounted on the same side of a handle/grip assembly or face in opposite directions while being mounted on opposite side of the handle/grip assembly whereby they may be incrementally advanced by the trigger handle/driving lever.

U.S. Pat. No. 5,022,137 describes a bar clamp, which is operable with one hand and includes a fixed jaw and a movable jaw. The movable jaw connects at one end to a movable slide bar. One-way drive means, by operation of a trigger handle grip, releasably engages the slide bar and advances the movable jaw toward the fixed jaw. Return motion of the movable jaw is accomplished manually when the one-way drive means is disengaged. A braking lever, biased to bind against the slide bar, prevents reverse motion of the movable jaw except when disengaged from the slide bar. The trigger handle advances the slide bar by driving a second lever which binds against a slide bar surface. The second lever returns by spring force to its original position after each stroke of the trigger handle.

U.S. Pat. No. 5,853,168 describes a bar clamp for single hand operation. It includes a housing, a fixed jaw and a movable jaw mounted on one end of a slide bar for movement in a direction toward the fixed jaw. A spring-loaded driving key is secured on the slide bar and through operation of a trigger handle engages the slide bar for advancing the movable jaw toward the fixed jaw. A locking key is biased against the slide bar and normally engaged with the slide bar to prevent motion of the second jaw away from the first jaw and actuatable to disengage from the slide bar to allow advancement of the second jaw away from the first jaw. The trigger handle has one end pivotably mounted within the housing and formed with two lateral mounting plates of arched outer configuration. The housing is comprised of a first housing portion and a second housing portion, with at least the driving key and the locking key being accommodated within the housing. The first housing portion has formed on an inside wall thereof a first support member for surrounding one of the mounting plates, and the second housing portion includes a second support member formed on an inside wall of the second housing portion for receiving the other one of the mounting plates.

U.S. Pat. No. 6,382,608 B1 describes an adjustable clamping and spreading bar clamp or bench vice that includes a fixed jaw and a movable jaw opposing the fixed jaw, where the fixed jaw and the movable jaw each include two jaw pads facing in opposite directions. The movable jaw connect at one end to a slide bar, which is movable to bring the movable jaw toward and away from the fixed jaw, the movable jaw includes means to releasably engages the slide bar and advances the movable jaw toward the fixed jaw or moves the movable jaw away from the fixed jaw for spreading or jacking. A two-way drive means is operational by a trigger handle grip. Also included is a pair of mechanical detent switches, which are rotated approximately ¼ revolution, to either change the direction of the movable jaw, or release the clamp after either clamping or spreading.

U.S. Pat. No. 6,386,530 B1 describes a bar clamp operated by squeezing a handle to close a jaw. The improvements of the invention include: low actuation force, two speed action to provide both high speed closing and high force clamping, a removable bar to allow different length bars to be installed into one body, a side mounted bar release button which allows easy access and an increased handle stroke, and reinforced wedge elements.

U.S. Pat. No. 6,412,767 B1 describes a method of attaching a clamping jaw to a support element comprising a stop element having the steps of positioning a stop element within a channel formed in the clamping jaw and blocking a first end of the channel and a second end of the channel so that the stop element is trapped between the first and second ends of the channel.

Notwithstanding the prior art, the present invention is neither taught nor rendered obvious thereby.

SUMMARY OF THE INVENTION

The present invention relates to a bar clamp with adjustable jaw pads for clamping and for spreading work pieces. It includes a main housing having a bar opening for extending a bar there through, and a bar advancing mechanism with a bar gripping member in proximity to the bar opening. There is an elongated slide bar extending through the bar opening of the main housing for relative movement of the bar through the main housing, and a handle and trigger connected to the main housing wherein the trigger is connected to the bar advancing mechanism of the main housing such that activation of the trigger causes advancement of the bar through the main housing. The main housing internal mechanisms for moving, locking, and unlocking are well known and within the abilities of the artisan. The prior art cited above illustrates various internal movement, hold and release mechanisms that may be employed in the main housing of the present invention.

The present invention also includes a first jaw base connected to the main housing and extending upwardly therefrom. A first jaw pad is rotatably connected to the first jaw base, and is rotatable in a first plane so as to adjust an angle between the elongated slide bar and the first jaw pad. There is a rotating means for rotating the first jaw pad in a second plane, relative to the elongated slide bar.

A separate, second jaw base is connected to the elongated slide bar, and this connection may be fixed or moveable, and moveable preferred. There is a second jaw pad rotatably connected to the second jaw base, and it is rotatable in a third plane so as to adjust an angle between the elongated slide bar and the second jaw pad. In some embodiments there is a second rotating means for rotation of the second jaw pad in a fourth plane relative to the elongated slide bar. The first plane and the third plane may be parallel or non-parallel and the second plane and fourth plane may likewise be parallel or non-parallel.

When the second jaw base is moveably connected to the elongated slide bar, it is preferably lockable on the elongated slide bar, and the second jaw base includes a lock means and a release means. This lock means and release means may be a friction lock with a spring biased release mechanism.

While the jaw pads of the present invention are generally flat, and are illustrated herein as flat, they may have a three dimensional topography (e.g. with serration or dimpling or reverse dimpling), and/or be curvilinear in one or two planes, so as to accommodate non-flat work pieces. They may be curved in a single plane (simple arc) or hemispherical (rotated arc of constant radius). They may be connected flat or curved sections of different planes connected to one another. They may be irregular cup shaped to accommodate a particular workpiece (rotatable arc of variable radii). They may be conical, truncated conical or any combination of all of the above, or any other gripping or holding shape. They could optionally or additionally base one or more suction cups or other fastening assist mechanisms on the jaw pads.

In some preferred embodiments, the second jaw base is removable from and directionally reversible relative to the elongated slide bar so that it is convertible from a clamping to a spreading device. When it is removed and reversed it may be attached to the elongated slide bar on the opposite end of the elongated slide bar so that the jaw pad is away from and faces opposite from the first jaw pad to create the spreading feature. Alternatively, one or both of the jaw pads may be flipped over the top of its base to face a generally opposite direction to shift from clamping to spreading and vice versa.

In some preferred embodiments, at least one of the first jaw pad and the second jaw pad, and preferably both, includes a jaw pad lock and release mechanism for selectively maintaining an angle between it and its base, and hence the elongated slide bar. The jaw pad lock and release mechanism may include a rotating, threaded lock that may be rotated in a first direction to lock a jaw pad at a selected angle, and rotated in a second, opposite direction to unlock said jaw pad.

In other preferred embodiments, at least one of the first jaw pad and the second jaw pad includes a one or more angle selection and lock mechanism arrangements.

The angle selection and lock mechanism arrangements may include a ratchet and gear mechanism to enable finer selection of angles. A calibration or angle scale could be shown on the side of or on a dial to further improve angle selection.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
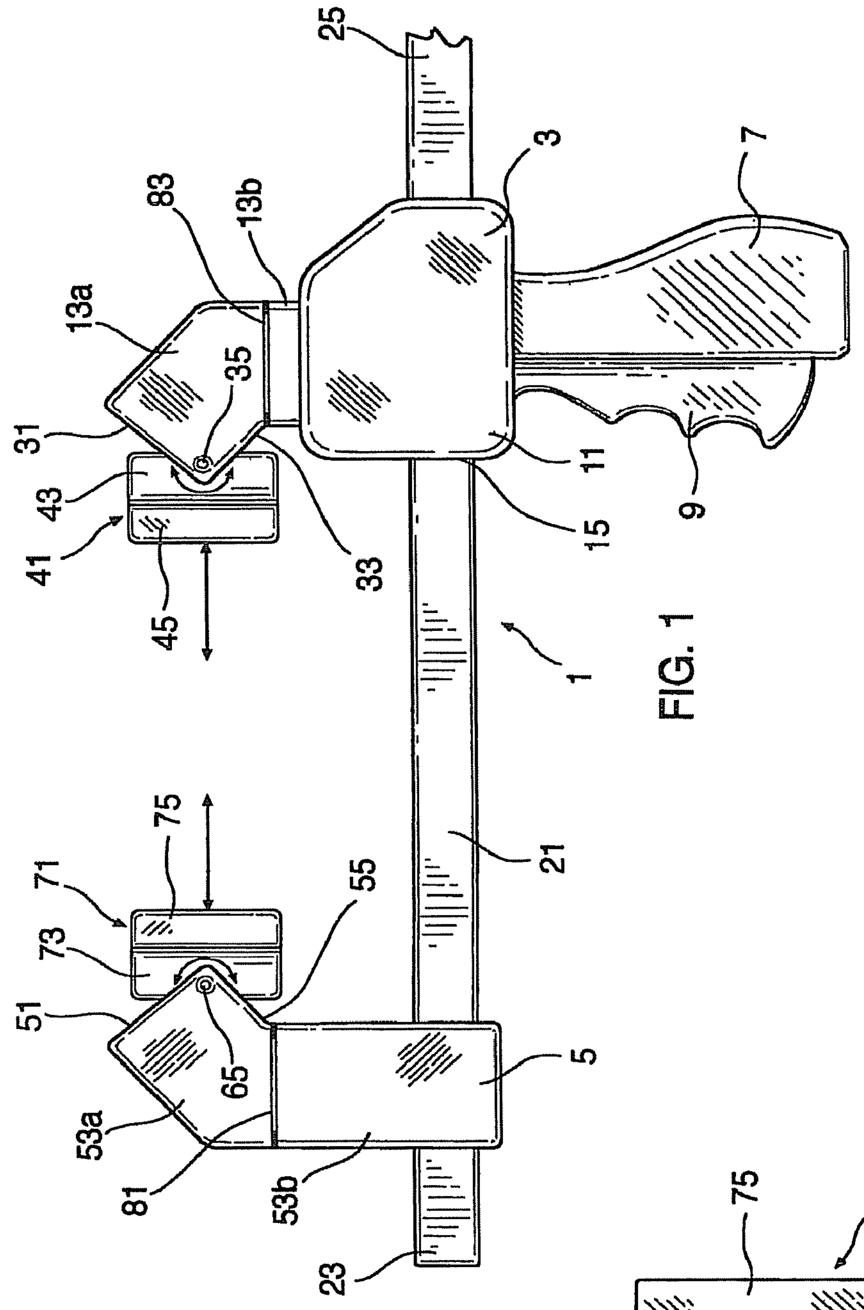
FIG. 1 illustrates a side view of a present invention bar clamp device.

FIG. 1 illustrates a side view of a present invention bar clamp device 1. It includes a main housing 3 with an outer casing 11 and has a bar advancing mechanism with a bar gripping member inside. This mechanism is conventional, as mentioned above. The main housing 3 has a handle 7 and a trigger 9 for holding the device and activating a release/bar advancing mechanism. There is a bar opening 15 that extends through main housing 3, and has the configuration to receive and hold elongated slide bar 21, as shown. Atop main housing 3 and extending upwardly therefrom is a first jaw base having a first upper jaw base section 13*a* and a first lower jaw base section 13*b* connected by a rotatable shaft connection 83. The shaft is vertical and at a right angle to elongated slide bar 21. This enables first upper jaw base section 13*a* and thus first jaw pad 41, to be rotated on the axis of the shaft connection 83.

First upper jaw base section 13*a* has a front 33 and a top 31. Rotatably connected to it is first jaw pad 41, having a support member 43, a compression member 45 and a rotational pin 35. Axle pin 35 is connected to the support member 43 and the jaw base 13 so that the jaw pad 41 may freely rotate about the pin 35 to adjust the angle between the jaw pad 41 and the first upper jaw base 13*a* (and hence the angle between the jaw pad 41 and the elongated slide bar 21). This rotation is about an axis that is perpendicular to the axis of movement (elongated central axis of movement) of the elongated slide bar 21. Thus, rotation in two separate planes is provided, one about pin 35 and one about shaft connection 83.

There is a second jaw base 5 that is connected directly to elongated slide bar 21, as shown. This could be fixedly attached, but is preferably movably, and, in some embodiments, removably and reversibly attached to the elongated slide bar 21. For example, it may include a spring biased release lock that is depressed for movement of this second jaw base 5.

Second jaw base 5 has a second upper jaw base section 53*a*, and a second lower jaw base section 53*b*. Upper jaw base section 53*a* includes a top 51 and a front 55. There is a second jaw pad 71 that has a support member 73 and a compression member 75. Support member 73 is rotatably connected to second jaw base 5 via axle pin 65 and renders the jaw pad 71 movable about an axis that is perpendicular to the elongated central axis of movement of the elongated slide bar 21.

Second upper jaw base section 53*a* and second lower jaw base section 53*b* are connected by a shaft connection 81 to provide a second plane rotation similar to that provided by shaft connection 83 described above.

Inside the main housing 3 and adjacent the bar opening 15 is the aforesaid mechanism for the locking, releasing and advancing of the bar. In the case of FIG. 1, each time a user pulls trigger 9, bar 21 will advance to the right, and right bar end 25 will move away from main housing 3 (with left end 23 and thus second jaw base 5, moving toward it).

Because both jaw pads 41 and 71 are rotatable on vertical shaft connections, they can be positioned facing each other, at any angle to one another, or even back to back. Thus, many shaped work pieces may be clamped or spread that could not heretofore be efficiently clamped or spread with prior art devices.

Figure 2:
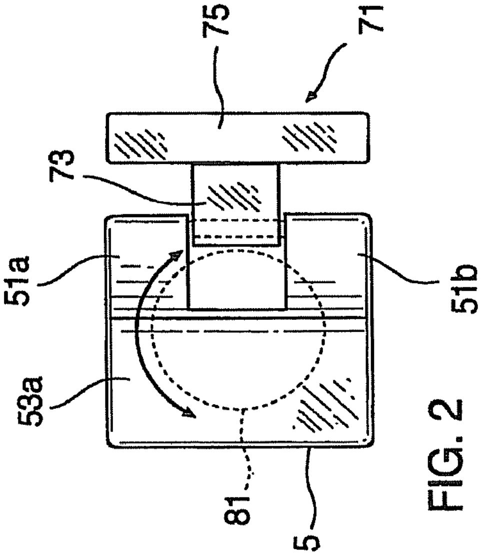
FIG. 2 shows a partial top view of the present invention device shown in FIG. 1.

FIG. 2 shows a partial top view of the present invention device second jaw base 5 and specifically, second upper jaw base section 53*a* and second jaw pad 71, shown in FIG. 1. It is seen that the top of second upper jaw base section 53*a* has two halves 51*a* and 51*b*; otherwise identical parts are identically numbered. Shaft connection 81 is shown hidden with an arrow indicating rotation.

Figure 3:
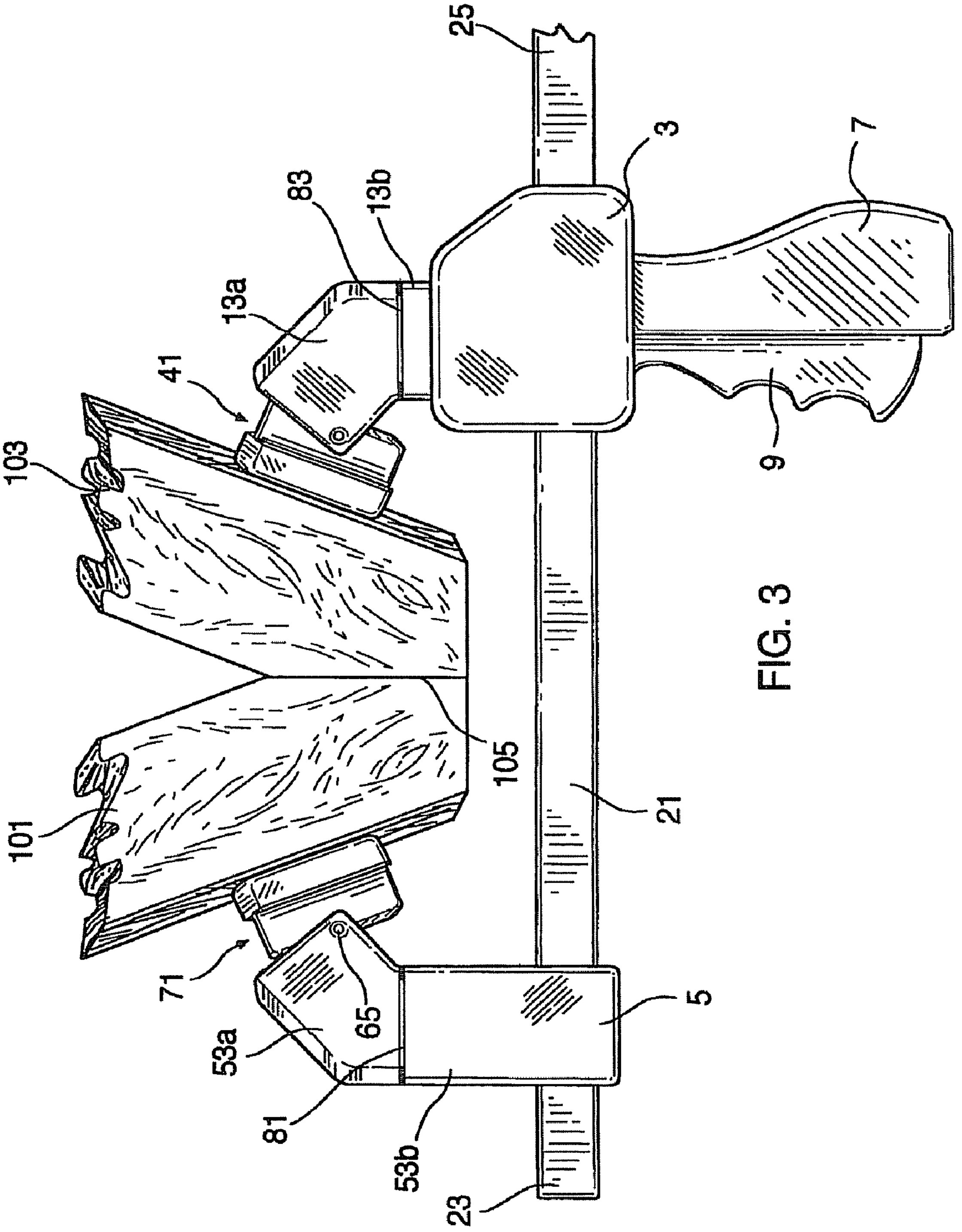
FIG. 3 shows a side view of the present invention device of FIGS. 1 and 2 above, in use with clamping a work piece, respectively.

FIG. 3 shows a side view of the present invention device of FIGS. 1 and 2 above, but in use, clamping a work piece. Again, identical parts are identically numbered.

As FIG. 3 shows, jaw pads 41 and 71 are clamping work pieces 101 and 103 that are not parallel and are not at the same angle, i.e. are not square, and thus, cannot be clamped with a conventional bar clamp. Here, the jaw pads adjust to the appropriate angles and provide surface-to-surface contact, non-parallel, non-square clamping. In this Figure, the work pieces 101 and 103 are being biscuit connected and glued together at joint 105.

Figure 4:
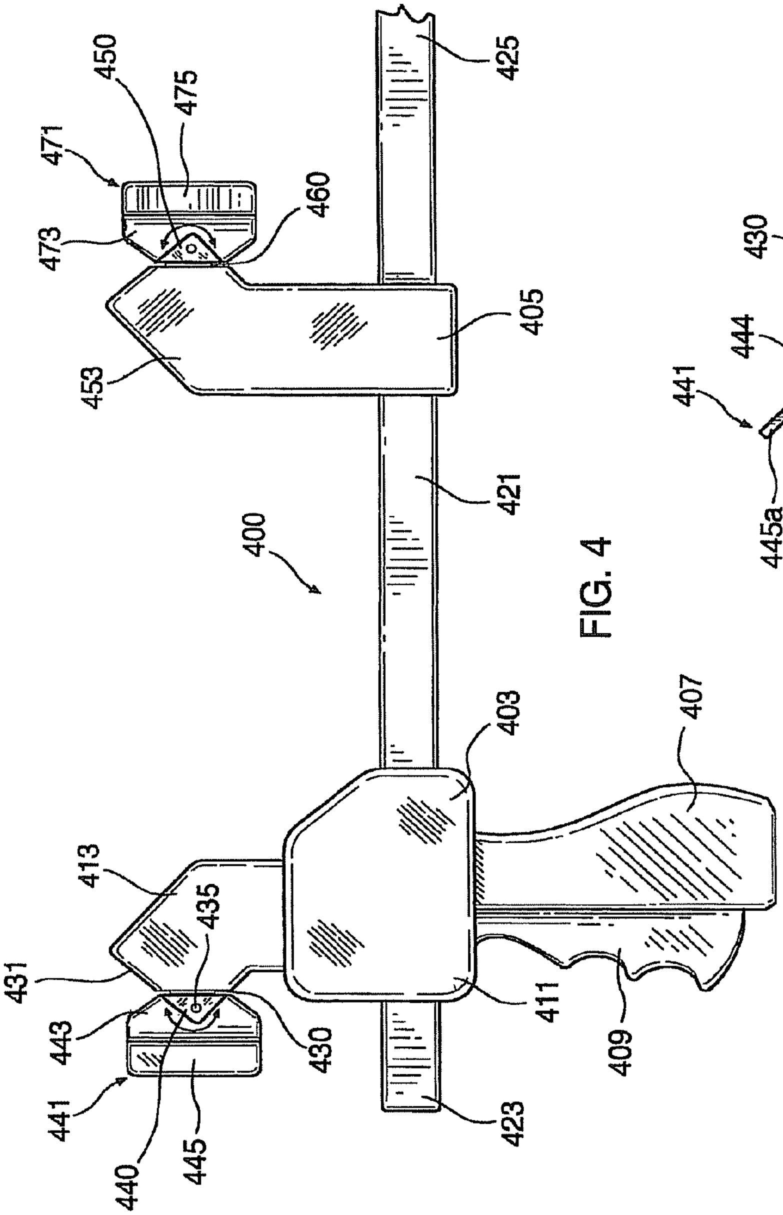
FIG. 4 shows a present invention alternative embodiment with axes of rotation parallel to and or right angles to the slide bar.

FIG. 4 illustrates an alternative embodiment present invention bar clamp device 400. It includes a main housing 403 with a handle 407, trigger 409 and outer casing 411. Main housing 403 identical to main housing 3 and its components described above in conjunction with FIG. 1. Thus, it has a bar advancing mechanism with a bar gripping member inside.

On main housing 403 and extending upwardly therefrom is a first jaw base 413, with a rotating means 440 connected by a rotatable shaft connection 430. The shaft is horizontal and parallel to elongated slide bar 421. This enables rotating means 440 and thus first jaw pad 441, to be rotated on the axis of the shaft connection 430. Rotatably connected to rotating means 440 is first jaw pad 441, having a support member 443, a compression member 445 and a rotational pin 435. Axle pin 435 is connected to the support member 443 and rotating means 440 so that the jaw pad 441 may freely rotate about the pin 435 to adjust the angle between the jaw pad 443 and the first jaw base 413 (and hence the angle between the jaw pad 441 and the elongated slide bar 421). This rotation is about an axis that is perpendicular to the axis of movement (elongated central axis of movement) of the elongated slide bar 421. Thus, rotation in two separate planes is provided, one about pin 435 and one about shaft connection 430.

There is a second jaw base 405 that is connected directly to elongated slide bar 421, as shown. This could be fixedly attached, but is preferably movably, removably and reversibly attached to the elongated slide bar 421. For example, it may include a spring biased release lock that is depressed for movement of this second jaw base 405.

Second jaw base 405 has a second jaw base 453 that includes a top 451 and a front 455. It has a rotating means 450 connected by shaft connection 460, as shown. There is a second jaw pad 471 that has a support member 473 and a compression member 475. Support member 473 is rotatably connected to second jaw base 405 via axle pin 465 and renders the jaw pad 471 movable about an axis that is perpendicular to the elongated central axis of movement of the elongated slide bar 421.

Again jaw pad rotation in two separate planes is provided.

Figure 5:
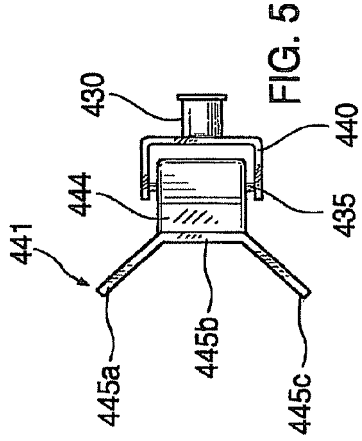

FIG. 5 shows one embodiment possible top view of a portion of present invention device 400, specifically jaw pad 441, pin 435, rotating mechanism 440 and shaft 430. Note that jaw pad 441 includes support member 444 with pin 435 therethrough, as well as three separate jaw pad front plates 445*a*, 445*b* and 445*c*, each connected to one another, but in different planes. This could be utilized to clamp work pieces that would fit into the shape formed by these jaw pad front plates.

Figure 6:
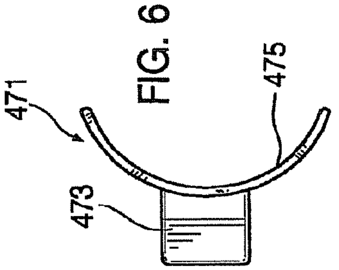
FIGS. 5 and 6 show partial top views of jaws of the present invention device shown in FIG. 4 to illustrate embodiments of non-single plane jaw pads.

Alternatively, by example, FIG. 6 shows a top view of one possible embodiment of jaw pad 471, with support 473 and an arcuate form plate 475, for holding curved, spherical, hemispherical, cylindrical, round-ended or other curved work pieces that it might accommodate.

Figure 7:
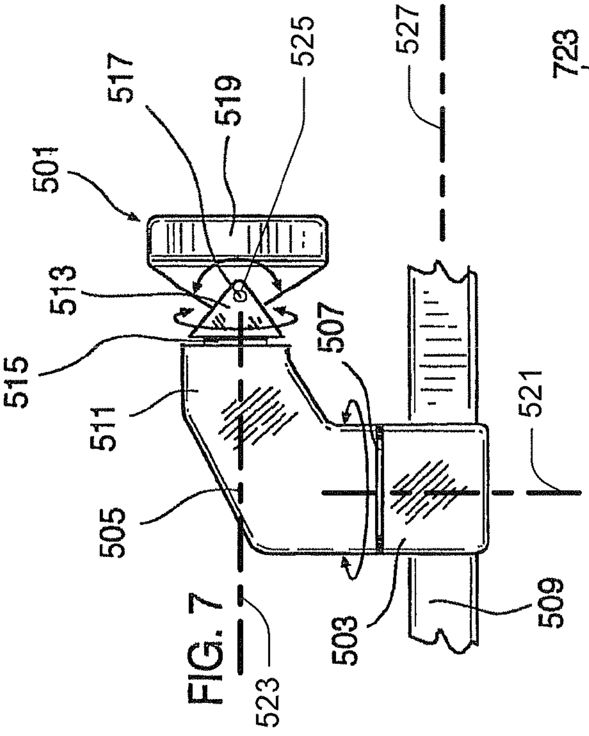
FIG. 7 shows a partial slide view of another present invention device jaw pad that is rotatable in three planes, all at right angles to one another.

FIG. 7 shows another preferred embodiment present invention bar clamp device 501. In this embodiment, the jaw pad has rotational mobility in three separate planes, each at right angles to one another. Bar clamp device 501 is shown in partial side view and shows the jaw pad without the main housing, trigger, etc. Lower jaw base section 503 is frictionally engaged with slide bar 509, as in conventional arrangements, wherein slide bar extends along axis 527. However, lower jaw base section 503 is rotatably connected to upper jaw base section 505 via vertical shaft connection 507. Additionally, at front end 511 of upper jaw base section 505 is horizontal shaft connection 515 and rotating means 513. This, in turn, is connected to jaw pad 519 via rotation pin 517. As can be seen from the Figure, rotation in three separate planes is provided, in particular, rotation about first axis 521 of vertical shaft connection 507, about second axis 523 of horizontal shaft connection 515, and about third axis 525 of rotation pin 517.

Figure 9:
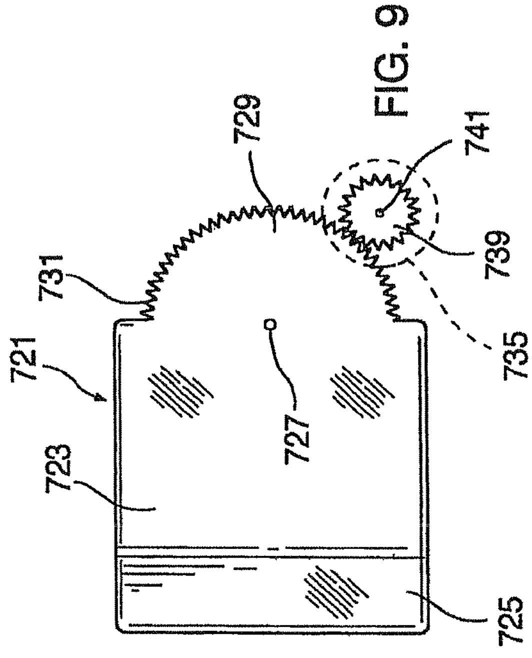
FIGS. 8 and 9 show side views of lockable and rotatable jaw pad angles.
Figure 8:
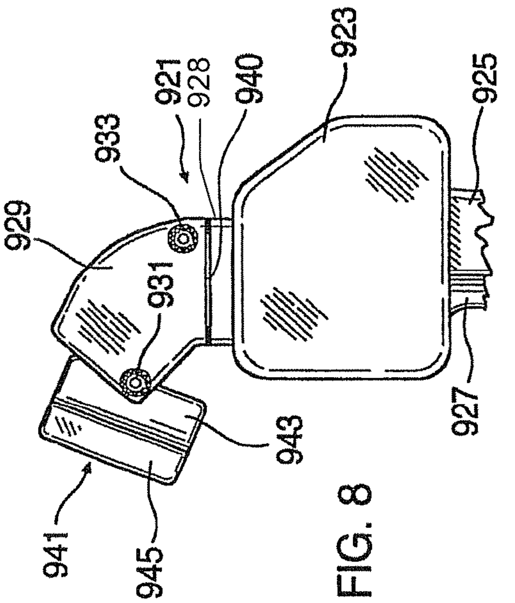

FIGS. 8 and 9 show side views of lockable and rotatable jaw pad angles.

In FIG. 8, a partial side view of portion of a present invention device 921. Its main housing 923 would be used, for example, in place of main housing 3 and all of its accoutrements shown in FIG. 1 on bar 21. Main housing 923 has a handle 925 and a trigger 927, as well as a first jaw base bottom 928 and first jaw base top 929. The bottom 928 and the top 929 are rotatably connected to one another via shaft 940. Floating jaw pad 941 with compression member 945 and support 943, may be free-floating to auto adjust to the angle of a work piece, and subsequently locked into that angle by locking dial 931. Dial 931 would rotate down to tighten and up to loosen the jaw pad 941 relative to the base top 929. A similar lock 933 could be used to rotate and lock base top 929 and bottom 928.

In an alternative present invention device 721 of FIG. 9, the angle may be set and then the work piece can be inserted at the pre-selected and preset angle. This diagrammatic representation shows jaw pad compression member 725 and jaw pad support member 723 with an axle pin 727 connected to a jaw base (not shown). It includes an arc of ratchets 731 geared to circular gear 739 on dial 735, rotating on pin 741. Dial 735 is a resistance dial and could include indicia for setting concise angles. A user would dial the angle it would remain there due to the resistance or it could have a lock-unlock feature to maintain a tight, strong angle position.

Obviously, numerous modifications and variations of the present invention are possible in light of the above teachings. For example, the devices of the present invention may include power-assist mechanisms, such as electromagnetic, electric, pneumatic, hydraulic, or other drive. The devices may include computer or chip technology to control or drive motors and/or mechanisms to select angles. Additionally, angle determining or angle setting lasers could be included. Radio or other wireless controls could be used to set angles, drive motors, set lasers or the like wherein a transmitter (e.g. from a cell phone, PDA, computer, etc) would send settings to a receiver/controller contained within the present invention device. It is therefore understood that within the scope of the appended claims, the invention may be practiced otherwise than as specifically described herein.

What is claimed is:

1. A clamp, comprising:

a main housing comprising a bar opening;

a first jaw base connected to the main housing via a first base-housing connector, wherein the first base-housing connector is operable to provide relative rotational movement between the first jaw base and the main housing about a first axis;

a first base-housing lock in communication with the first base-housing connector, wherein the first base-housing lock is operable to selectively fix a relative rotational orientation between the first jaw base and the main housing;

a first jaw pad connected to the first jaw base via a first pad-base connector, wherein the first pad-base connector is operable to provide relative rotational movement between the first jaw pad and the first jaw base about a second axis different from the first axis;

a first pad-base lock in communication with the first pad-base connector, wherein the first pad-base lock is operable to selectively fix a relative rotational orientation between the first jaw pad and the first jaw base;

a first rotatable connector connecting the first jaw pad and the first pad-base connector, wherein the first rotatable connector is operable to provide relative rotational movement between the first jaw pad and the first pad-base connector about a third axis different from both the first axis and second axis;

an elongated bar movably extendable through the bar opening;

a second jaw base movably connectable to the bar, the second jaw base having a lower base section connectable to an upper base section via a base section connector, wherein the base section connector is operable to provide relative rotational movement between the upper base section of the second jaw base and the lower base section about a fourth axis;

an upper-lower base section lock in communication with the base section connector, wherein the upper-lower base section lock is operable to selectively fix a relative rotational orientation between the upper base section of the second jaw base and the lower base section;

a second jaw pad connected to the second jaw base via a second pad-base connector, wherein the second pad-base connector is operable to provide relative rotational movement between the second jaw pad and the second jaw base about a fifth axis different from the fourth axis;

a second pad-base lock in communication with the second pad-base connector, wherein the second pad-base lock is operable to selectively fix a relative rotational orientation between the second jaw pad and the second jaw base; and a second rotatable connector connecting the second jaw pad and the second pad-base connector, wherein the second rotatable connector is operable to provide relative rotational movement between the second jaw pad and the second pad-base connector about a sixth axis different from both the fourth axis and fifth axis.

2. The clamp of claim 1, wherein each of the first axis, the second axis and the third axis are oriented about 90 degrees from one another, and wherein each of the fourth axis, the fifth axis and the sixth axis are oriented about 90 degrees from one another.

3. The claim of claim 1, wherein the first axis is substantially parallel to the fourth axis, wherein the second axis is substantially parallel to the fifth axis, and wherein the third axis is substantially parallel to the sixth axis.

4. The clamp of claim 3, wherein each of the first axis, the second axis and the third axis are oriented about 90 degrees from one another, and wherein each of the fourth axis, the fifth axis and the sixth axis are oriented about 90 degrees from one another.

5. The clamp of claim 1, wherein the bar extends along a seventh axis, wherein the seventh axis is substantially perpendicular to the first axis and the fourth axis, and wherein each of the first axis, the second axis and the third axis are oriented about 90 degrees from one another, and wherein each of the fourth axis, the fifth axis and the sixth axis are oriented about 90 degrees from one another.

6. The clamp of claim 1, further comprising angle indicia for determining an angle of the first jaw pad, or the second jaw pad, or both.

7. The clamp of claim 1, further comprising angle indicia for determining an angle between each of the first jaw pad and the first pad-base connector, the first pad-base connector and the first jaw base, the first jaw base and the main housing, the second jaw pad and the second pad-base connector, the second pad-base connector and the second jaw base, the second jaw base and the bar.

8. The clamp of claim 1, wherein at least one of the first jaw pad or the second jaw pad further comprises a surface contactable with a work piece, wherein the surface comprises a non-planar surface.

9. The clamp of claim 1, wherein at least one of the first jaw pad or the second jaw pad further comprises a surface contactable with a work piece, wherein the surface comprises a curved surface.

10. The clamp of claim 1, wherein at least one of the first jaw pad or the second jaw pad further comprises multiple surfaces contactable with a work piece.

11. The clamp of claim 1, wherein the multiple surfaces comprise a plurality of planar surfaces, wherein each of the plurality of planar surfaces is substantially non-parallel.

12. The clamp of claim 1, wherein the first jaw pad further comprises a first contact surface, wherein the second jaw pad further comprises a second surface, wherein each of the first contact surface and the second contact surface are contactable with a corresponding portion of one or more work pieces, and wherein the respective first contact surface and the second contact surface are selectively locked at non-parallel angles.

13. The clamp of claim 1, wherein the first jaw pad further comprises a first contact surface having a first shape, wherein the second jaw pad further comprises a second contact surface having a second shape, wherein the first shape is different from the second shape.

14. The clamp of claim 13, wherein the first shape comprises a planar surface and wherein the second shape comprises a curved surface.

15. The clamp of claim 1, wherein at least one lock selected from the group of the first base-housing lock, the first pad-base lock, the first rotatable connector lock, the second base-housing lock, the second pad-base lock, and the second rotatable connector lock further comprises a ratchet and gear mechanism to hold and release a respective relative rotational orientation.

16. The clamp of claim 1, wherein at least one lock selected from the group of the first base-housing lock, the first pad-base lock, the second base-housing lock, and the second pad-base lock further comprises a friction lock mechanism to hold a respective relative rotational orientation and a spring biased release mechanism to unlock the respective relative rotational orientation.

17. The clamp of claim 1, wherein at least one lock selected from the group of the first base-housing lock, the first pad-base lock, the second base-housing lock, and the second pad-base lock further comprises a rotatable, threaded lock mechanism operable to rotate in a first direction to hold a respective relative rotational orientation and to rotate in a second direction, different from the first direction, to unlock the respective relative rotational orientation.

18. The clamp of claim 1, wherein the second jaw base is movably connectable to the bar.

19. The clamp of claim 1, wherein each of the first base-housing lock, the first pad-base lock, the second base-housing lock, and the second pad-base lock is selectively lockable to fix a relative position of each of the first jaw pad, the first jaw base, the main housing, the bar, the second jaw base and the second jaw pad.

20. The clamp of claim 1, wherein the second jaw base is removable from and directionally reversible relative to the bar.

21. The clamp of claim 1, wherein the first jaw pad further comprises a first contact surface, wherein the second jaw pad further comprises a second contact surface, wherein the first contact surface and the second contact surface comprise fastening-assist mechanisms.

22. The clamp of claim 1, further comprising a power-assist mechanism selected from the group consisting of an electromagnetic drive, an electric drive, a pneumatic drive, and a hydraulic drive.

23. The clamp of claim 1, further comprising a controller in communication with at least one drive motor connected to at least one portion of the clamp operable for relative rotational movement, wherein the controller is operable to receive settings corresponding to a predetermined angle at which to drive the at least one drive motor.

24. A clamp, comprising:

a main housing comprising a bar opening;

a first jaw base connected to the main housing via a first base-housing connector, wherein the first base-housing connector is operable to provide relative rotational movement between the first jaw base and the main housing about a first axis;

a first base-housing lock in communication with the first base-housing connector, wherein the first base-housing lock is operable to selectively fix a relative rotational orientation between the first jaw base and the main housing;

a first jaw pad connected to the first jaw base via a first pad-base connector, wherein the first pad-base connector is operable to provide relative rotational movement between the first jaw pad and the first jaw base about a second axis different from the first axis;

a first pad-base lock in communication with the first pad-base connector, wherein the first pad-base lock is operable to selectively fix a relative rotational orientation between the first jaw pad and the first jaw base;

a first rotatable connector connecting the first jaw pad and the first pad-base connector, wherein the first rotatable connector is operable to provide relative rotational movement between the first jaw pad and the first pad-base connector about a third axis different from both the first axis and second axis;

an elongated bar movably extendable through the bar opening;

a second jaw base movably connectable to the bar, the second jaw base having a lower base section connectable to an upper base section via a base section connector, wherein the second base-bar connector is operable to provide relative rotational movement between the upper base section of the second jaw base and the lower base section about a fourth axis;

an upper-lower base section lock in communication with the base section connector, wherein the upper-lower base section lock is operable to selectively fix a relative rotational orientation between the upper base section of the second jaw base and the lower base section;

a second jaw pad connected to the second jaw base via a second pad-base connector, wherein the second pad-base connector is operable to provide relative rotational movement between the second jaw pad and the second jaw base about a fifth axis different from the fourth axis;

a second pad-base lock in communication with the second pad-base connector, wherein the second pad-base lock is operable to selectively fix a relative rotational orientation between the second jaw pad and the second jaw base;

a second rotatable connector connecting the second jaw pad and the second pad-base connector, wherein the second rotatable connector is operable to provide relative rotational movement between the second jaw pad and the second pad-base connector about a sixth axis different from both the fourth axis and fifth axis;

wherein the first axis is substantially parallel to the fourth axis, wherein the second axis is substantially parallel to the fifth axis, and wherein the third axis is substantially parallel to the sixth axis;

wherein the bar extends along a seventh axis, wherein the seventh axis is substantially perpendicular to the first axis and the fourth axis, and wherein each of the first axis, the second axis and the third axis are oriented about 90 degrees from one another, and wherein each of the fourth axis, the fifth axis and the sixth axis are oriented about 90 degrees from one another;

wherein the first jaw pad further comprises a first contact surface having a first shape, wherein the second jaw pad further comprises a second surface having a second shape, wherein the first shape is different from the second shape;

angle indicia for determining an angle of the first jaw pad and the second jaw pad; and a controller in communication with at least one drive motor connected to at least one portion of the clamp operable for relative rotational movement, wherein the controller is operable to receive settings corresponding to a predetermined angle at which to drive the at least one drive motor.

* * * * *